(12) United States Patent
Maehara et al.

(10) Patent No.: US 9,982,731 B2
(45) Date of Patent: May 29, 2018

(54) DISC BRAKE APPARATUS

(71) Applicant: AKEBONO BRAKE INDUSTRY CO., LTD., Tokyo (JP)

(72) Inventors: Toshifumi Maehara, Tokyo (JP); Kazuhiro Yoshikawa, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days. days.

(21) Appl. No.: 15/111,578

(22) PCT Filed: Feb. 6, 2015

(86) PCT No.: PCT/JP2015/053437
§ 371 (c)(1),
(2) Date: Jul. 14, 2016

(87) PCT Pub. No.: WO2015/119262
PCT Pub. Date: Aug. 13, 2015

(65) Prior Publication Data
US 2016/0327105 A1     Nov. 10, 2016

(30) Foreign Application Priority Data
Feb. 7, 2014   (JP) ................................. 2014-022387

(51) Int. Cl.
*F16D 65/02*     (2006.01)
*F16D 65/00*     (2006.01)
(Continued)

(52) U.S. Cl.
CPC .......... *F16D 65/0056* (2013.01); *B60T 17/08* (2013.01); *F16D 65/0068* (2013.01); *F16D 55/225* (2013.01); *F16D 2121/08* (2013.01)

(58) Field of Classification Search
CPC .......... F16D 65/02; F16D 65/18; F16D 55/22; F16D 55/224; F16D 55/2245
(Continued)

(56) References Cited

U.S. PATENT DOCUMENTS

| 4,697,671 A * | 10/1987 | Stewart ............... F16D 55/2245 188/250 G |
| 5,101,939 A * | 4/1992 | Sheridan .................. B66D 5/14 188/171 |
| 9,157,496 B2 * | 10/2015 | Prouzet ............... F16D 55/2245 |

FOREIGN PATENT DOCUMENTS

| CN | 103038120 A | 4/2013 |
| JP | S56-52631 A | 5/1981 |

(Continued)

OTHER PUBLICATIONS

Office Action dated Nov. 1. 2017 for application CN 201580006541.8.

*Primary Examiner* — Christopher P Schwartz
(74) *Attorney, Agent, or Firm* — Drinker Biddle & Reath LLP (57) ABSTRACT

A disc brake apparatus that holds brake pads (46) and is capable of holding a caliper body (30) in a part of the support is provided with a support in which pairs of torque receiving parts (16, 18) provided in both sides in a braking force tangential direction and connecting parts (20) respectively connecting together the torque receiving parts (16, 18) are provided in both sides in an axial-direction of a rotor. In the support, at least one of the torque receiving parts (16, 18) is capable of being divided. The support (12) includes an open part capable of inserting and removing the brake pads (46) in the braking force tangential direction by dividing the torque receiving parts.

6 Claims, 8 Drawing Sheets

(51) Int. Cl.
  *B60T 17/08* (2006.01)
  *F16D 55/225* (2006.01)
  *F16D 121/08* (2012.01)
(58) Field of Classification Search
  USPC ................. 188/72.1, 72.6, 72.9, 52, 56, 171
  See application file for complete search history.

(56) References Cited

FOREIGN PATENT DOCUMENTS

| JP | S58-109739 A | 6/1983 |
| JP | S62-24038 A | 2/1987 |
| JP | H11-233299 A | 8/1999 |

* cited by examiner

DISC BRAKE APPARATUS

TECHNICAL FIELD

The invention relates to a disc brake apparatus.

BACKGROUND ART

A caliper body employed in a floating type disc brake apparatus generally includes as basic parts a cylinder part including a piston, a claw part for receiving a reacting force of the piston, and a bridge part for connecting these two parts to each other. The bridge part is requested to have a strength which, in braking, can suppress spreading of the cylinder part and claw part. In the floating type disc brake apparatus, in the bridge part, there is hardly formed an opening capable of replacing a brake pad.

Most of the floating type disc brake apparatuses employ a structure in which the caliper body is supported at two points with respect to a support and the brake pad is supported by the support. Thus, when replacing the brake pad, the caliper body must be removed from the support before the brake pad is replaced. Here, depending on the brake pad holding mode and the caliper body supporting mode, as disclosed in the patent document 1, one of the two support parts is opened and the caliper body is rotated about the remaining support part to replace the brake pad.

PRIOR ART DOCUMENT

Patent Document

Patent document 1: JP-A-58-109739

SUMMARY OF THE INVENTION

Problems that the Invention is to Solve

The above-mentioned operation, in a disc brake apparatus employed in an ordinary vehicle and the like, can hardly raise a trouble. However, a disc brake apparatus employed in a large-sized vehicle, industrial machine, lifting apparatus and the like, a large axial force is necessary in order to obtain a high braking force. Thus, a caliper body is upsized and an actuator for operation is provided additionally, thereby increasing the weight of the apparatus.

In such case, great efforts must be made to carry out the operations to mount and remove the caliper body and rotate it, and the operations themselves incur danger.

Thus, the invention has an object to provide a disc brake apparatus which, while maintaining the assembled state of a caliper body, can replace a brake pad in a floating type disc brake apparatus.

Means for Solving the Problems

The above object of the invention can be attained by the following structures.

(1) A disc brake apparatus provided with a support in which pairs of torque receiving parts provided in both sides in a braking force tangential direction and connecting parts respectively connecting together the torque receiving parts are provided in both sides in an axial-direction of a rotor. The support holds brake pads and is capable of holding a caliper body in a part of the support. In the support, at least one of the torque receiving parts is capable of being divided. The support includes an open part capable of inserting and removing the brake pads in the braking force tangential direction by dividing the torque receiving parts.

(2) A disc brake apparatus according to the above (1) structure, in which the support is structured by arranging a pad hold frame and a body hold frame in a frame-like shape. The pad hold frame includes the torque receiving parts and the connecting parts to hold the brake pads. The body hold frame is arranged on an outer peripheral side of the rotor, is connected to the torque receiving parts, and holds the caliper body.

This structure can enhance the rigidity of the support with respect to a force in the braking force tangential direction.

(3) A disc brake apparatus according to the above (2) structure, in which the dividable torque receiving part includes a rotatable pivotal support part in one of a fastening end part with respect to the connecting part and a fastening end part with respect to the body hold frame, and in which the dividable torque receiving part includes a fastening part in the other of the fastening end part with respect to the connecting part and the fastening end part with respect to the body hold frame.

This structure can provide the open part without removing the torque receiving part of the pad hold frame completely.

(4) A disc brake apparatus according to the above (2) or (3) structure, in which the caliper body is structured such that a cylinder part and a claw part arranged across the rotor are connected to each other by a bridge part, and in which the bridge part is arranged in an inner peripheral side with respect to the body hold frame.

(5) A disc brake apparatus according to the above (2) or (3) structure, in which the caliper body is structured such that a cylinder part and a claw part arranged across the rotor are connected to each other by a bridge part, and in which the bridge part is arranged in an outer peripheral side with respect to the body hold frame.

Effects of the Invention

According to the above structured disc brake apparatus, while maintaining the assembled state of the caliper body, the brake pad replacing operation in the floating type disc brake apparatus can be carried out.

MODE FOR CARRYING OUT THE INVENTION

Description is given below specifically of embodiments of a disc brake apparatus according to the invention with reference to the drawings.

Figure 1:
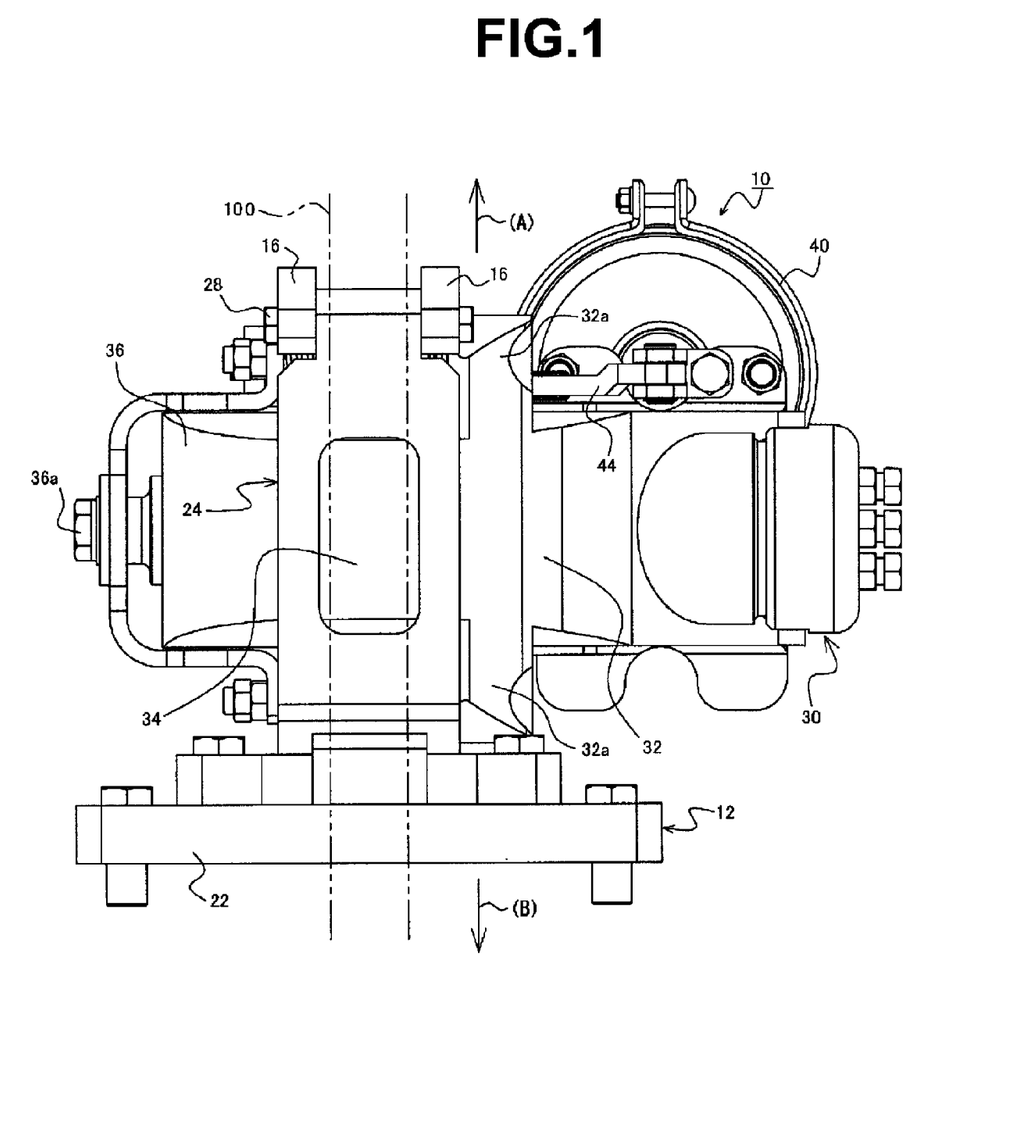
FIG. 1 is a view of a structure of an assembled state of a disc brake apparatus according to an embodiment of the invention, when viewed from an outer peripheral side of a rotor.
Figure 2:
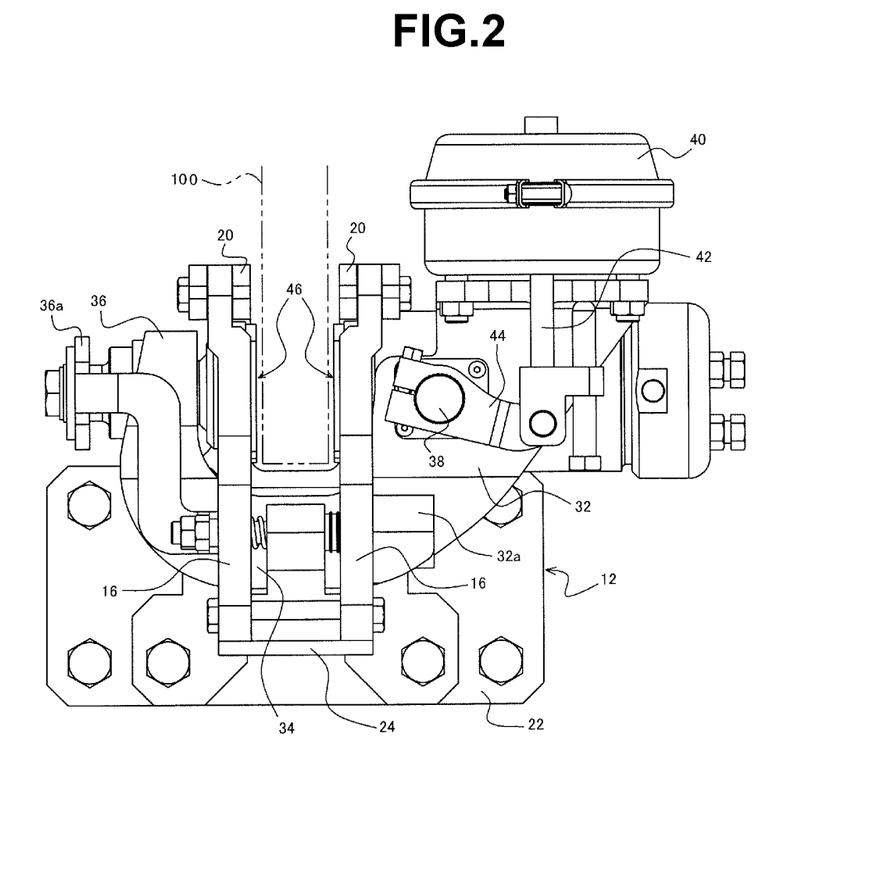
FIG. 2 is an upper view when the view of FIG. 1 is assumed as a front view.
Figure 3:
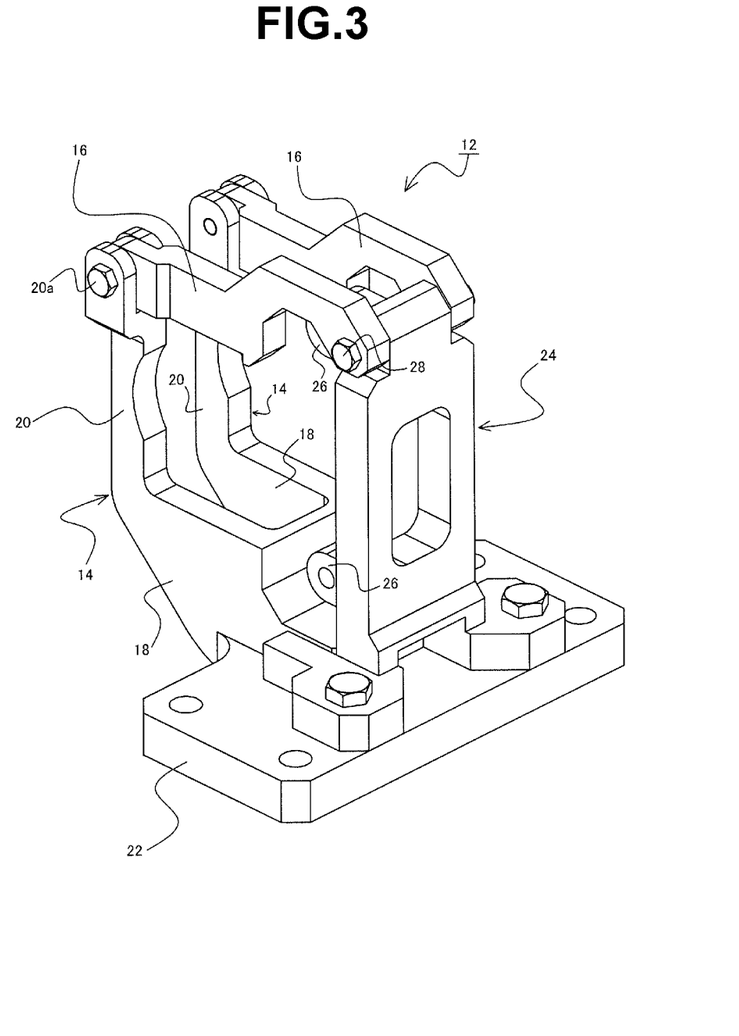
FIG. 3 is a perspective view of the structure of a support.
Figure 4:
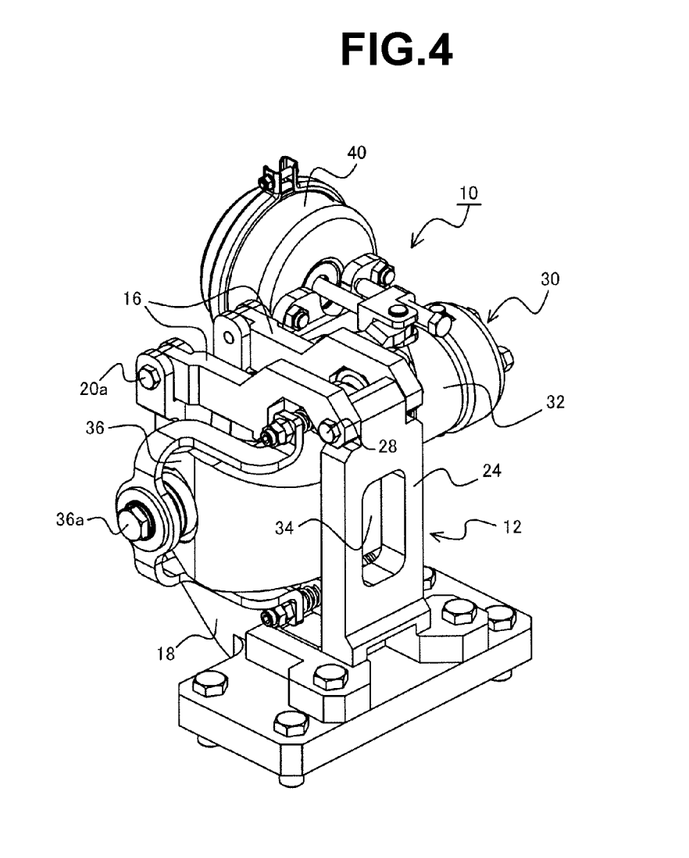
FIG. 4 is a perspective view of the structure of the disc brake apparatus when the support is closed.
Figure 5:
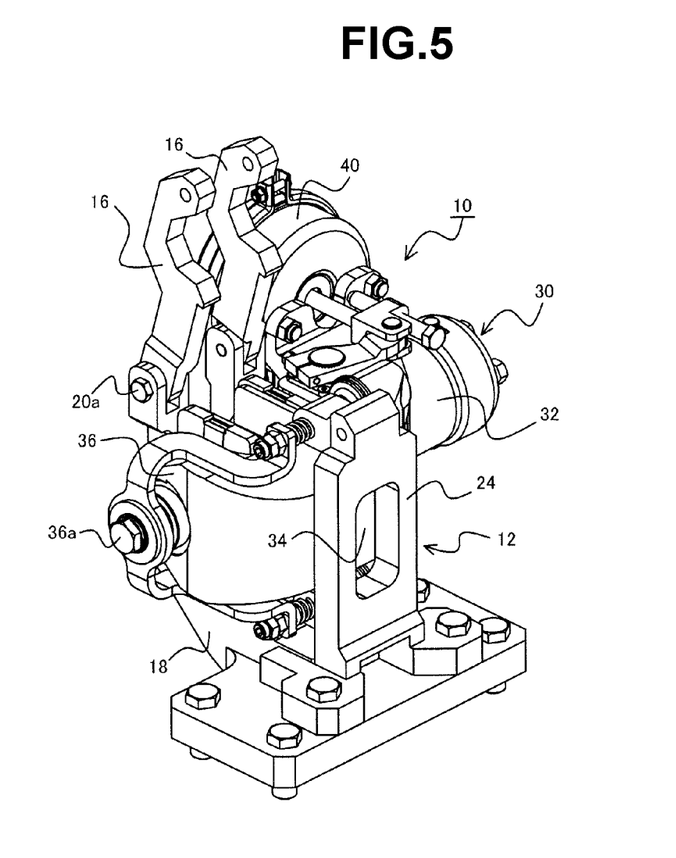
FIG. 5 is a perspective view of the structure of the disc brake apparatus when the support is opened.

A specific example of the disc brake apparatus of the invention is shown in FIGS. 1 to 5. FIG. 1 is a view of the assembled state of the disc brake apparatus, when viewed from the outer peripheral side of a rotor. FIG. 2 is an upper view when FIG. 1 is assumed as a front view. FIG. 3 is a perspective view of the structure of a support. FIG. 4 is a perspective view of the structure of the disc brake apparatus when the support is closed. FIG. 5 is a perspective view of the structure of the disc brake apparatus when the support is in part opened. The disc brake apparatus 10 shown in FIGS. 1, 2, 4 and 5 is a so-called negative type disc brake apparatus which also includes a mechanical actuator.

The disc brake apparatus 10 of this embodiment is basically provided with a support 12, a caliper body 30 and an actuator 40, wherein brake pads 46 are pressed against the sliding surface of a rotor 100 to thereby develop a braking force.

The support 12 of this embodiment, as shown in FIG. 3, includes basically a pad hold frame 14 and a body hold frame 24. The pad hold frame 14 is used to hold the brake pads 46 and includes, in a braking force tangential direction (direction shown by the arrows (A), (B) in FIG. 1), a pair of torque receiving parts (one torque receiving part 16, the other torque receiving part 18). The paired torque receiving parts 16 and 18 are connected to each other through connecting parts 20. Also, in the pad hold frame 14 of this embodiment, one torque receiving part 16 is pivotally supported with respect to the connecting part 20 and can be rotated while a fastening part 20a thereof for fastening the part 16 to the connecting part 20 is used as a rotation base point.

The thus structured pad hold frames 14 are arranged respectively on the axial-direction two side surfaces of the rotor 100. In a state shown in FIG. 3, there is employed a structure in which the two pad hold frames 14 to be arranged on the two side surfaces of the rotor 100 are connected together by the end of the other torque receiving part 18 and are then fixed to a base 22, whereby the pad hold frames 14 are supported.

Meanwhile, the body hold frame 24 is used to hold a caliper body 30 to be described specifically. Thus, the body hole frame 24 includes a hold part 26 for holding the caliper body 30. The body hold frame 24 is arranged opposed to the connecting part 20 such that it extends between one torque receiving part 16 and the other torque receiving part 18 (a pair of torque receiving parts) arranged opposed to each other in the braking force tangential direction. Due to this structure, the support 12 is structured such that the pad hold frames 14 and body hold frame 24 are arranged in a frame-like shape. Such structure can enhance the strength against a force applied in the braking force tangential direction.

Here, one end of the body hold frame 24 is connectable to one torque receiving part 16 in the pad hold frame 14, while the other end is fastened and fixed to the base 22. Connection between one torque receiving part 16 and body hold frame 24 can be attained, for example, by bolt fixation through a penetration hole. With this structure, by pulling out a bolt 28, one torque receiving part 16 can be rotated in a frame opening direction with the fastening part 20a for the connecting part 20 as the rotation base point.

The caliper body 30 includes basically a cylinder part 32, a claw part 36 and a bridge part 34. The cylinder part 32 is used to generate an axial force to press the brake pad 46 against the sliding surface of the rotor 100. Inside the cylinder part 32, although not shown, there are arranged a piston, a spring for generating a pressing force and a cam mechanism for removing the pressing force, while a rotation shaft 38 for operating the cam mechanism is projected externally. Also, the cylinder part 32 includes a hold part 32a to be fastened to the hold part 26 of the body hold frame 24 of the support 12.

The claw part 36 is a reacting force receiver arranged opposed to the cylinder part 32 through the rotor 100. In the claw part 36, the brake pad 46 is arranged through an adjuster mechanism 36a used to adjust a clearance between the rotor 100 and brake pad 46.

The bridge part 34 is used to connect together the cylinder part 32 and claw part 36 arranged opposed through the rotor 100. The bridge part 34 of this embodiment, as shown in FIG. 2, is structured to be interposed between the rotor 100 and body hold frame 24. This structure reduces the distance (distance in the rotor radial direction) from the axial force generating cylinder part 32 to the bridge part 34. This can suppress a force which is generated due to generation of the axial force and is applied in a direction to spread the cylinder part 32 and claw part 36. Thus, even when the bridge part 34 has a reduced thickness, necessary and sufficient strength can be maintained, thereby enabling downsizing and weight reduction of the caliper body 30.

The actuator 40 is used to rotate a rotation shaft 38 of a cam mechanism projected from the cylinder part 32. The actuator 40 of a type shown in FIGS. 1, 2 and the like is an air chamber. The air chamber includes a direct acting rod 42, in which, when the rod 42 and rotation shaft 38 are connected together by a cam lever 44, a linear motion by the air chamber can be given to the rotation shaft 38 as a rotary motion.

In the thus structured disc brake apparatus 10, when a bolt 28 fastening together the body hold frame 24 and one torque receiving part 16 of the pad hold frame 14 is removed, one torque receiving part 16 can be rotated with the fastening part 20a for the connecting part 20 as the rotation base point, thereby enabling formation of an open part in the frame-shaped support 12.

The open part is formed in a direction (braking force tangential direction) where a braking torque is applied in the support 12 (see FIG. 5). Thus, the brake pads 46 can be pulled out toward the cylinder part 32, toward the claw part 36 and in the braking force tangential direction. Here, of course, also when assembling the brake pads 46, they can be inserted through the open part.

Accordingly, in the disc brake apparatus 10 of this embodiment, when replacing the brake pads 46, or when confirming abrasion of the brake pads 46, there is eliminated the need to remove the heavy caliper body 30, thereby enabling labor reduction and enabling safe and quick execution of the operations to replace the brake pads 46 and confirm the abrasion thereof.

Figure 6:
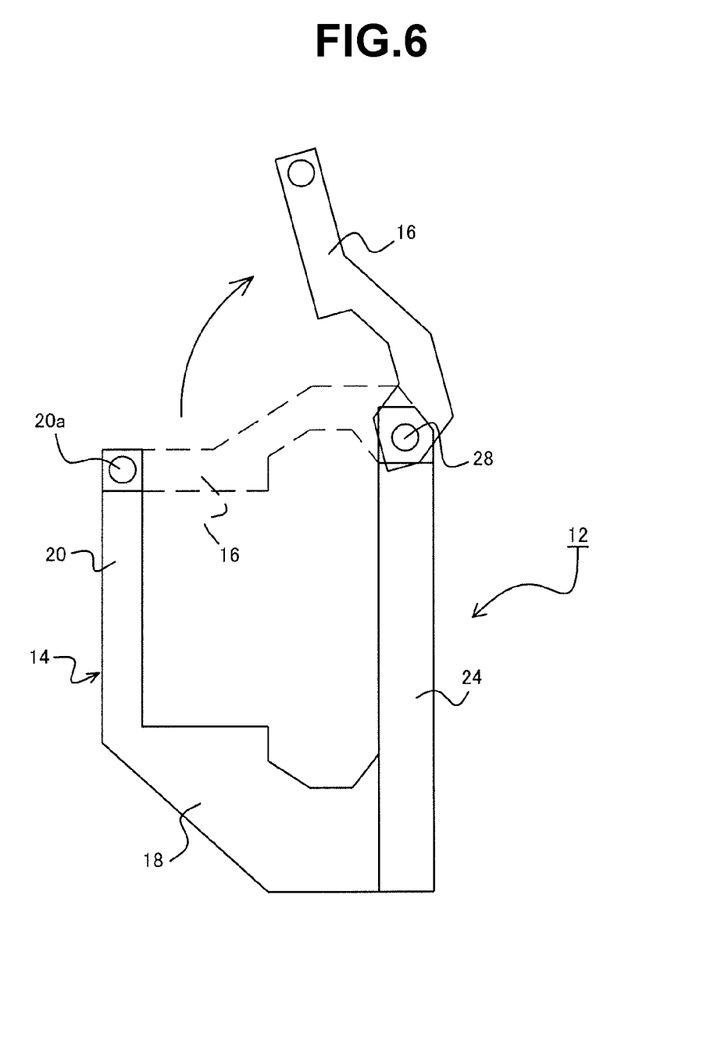
FIG. 6 is a block diagram of an example of the structure of the support when one torque receiving part is rotated with a body hold frame side fastening part as the base point thereof.

Also, in the above embodiment, one torque receiving part 16 is rotated with the fastening part 20a for the pad hold frame 14 as the rotation base point. However, the fastening part 20a of one torque receiving part 16 for the connecting part 20, as shown in FIG. 6, may also be removed and one torque receiving part 16 may be rotated with a fastening part thereof (fastening part by the bolt 28) for the body hold frame 24 as the rotation base point.

Figure 7:
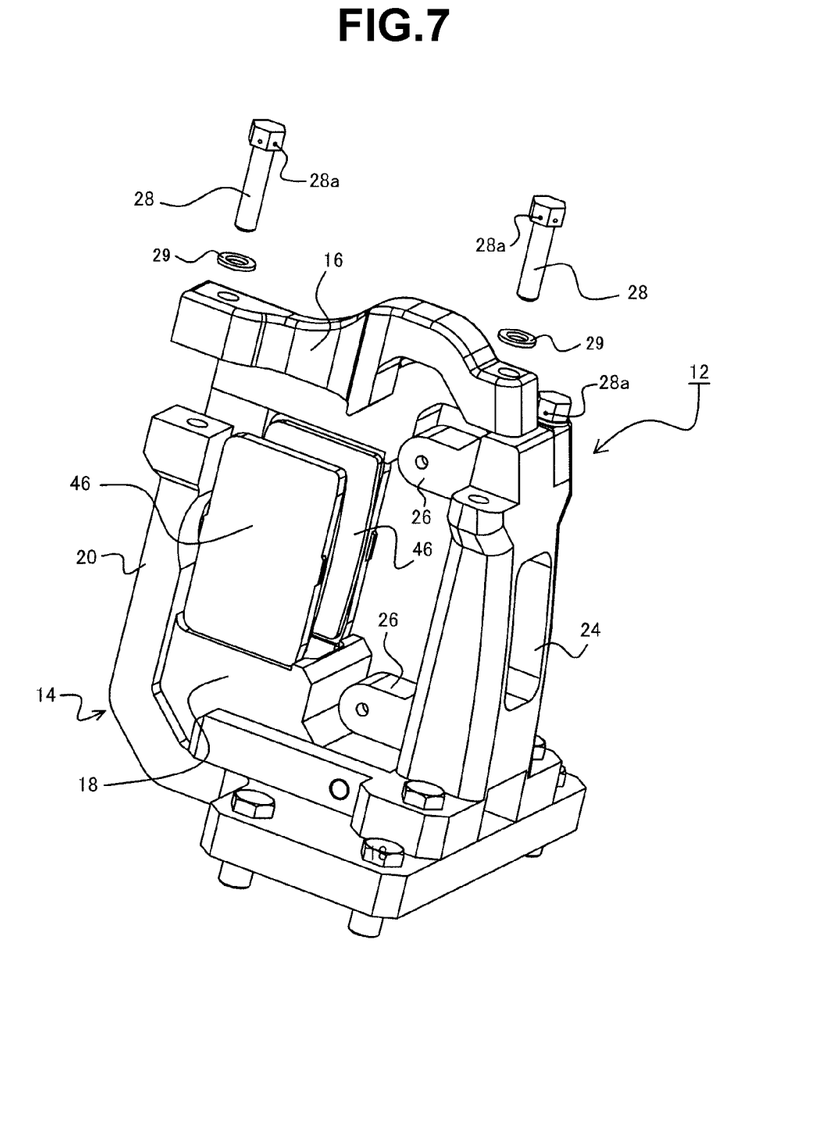
FIG. 7 is a block diagram of an example of the structure of the support when one torque receiving part is completely divided to thereby constitute an opened part.

Also, as shown in FIG. 7, one torque receiving part 16 also be structured to be removable. In this case, as shown in FIG. 7, one torque receiving part 16 may also be fastened to both of the connecting part 20 and body hold frame 24 using a bolt from the braking force tangential direction. In this fastening method, after a washer 29 is inserted and fastened by a bolt 28, a wire (not shown) is inserted through a penetration hole 28a formed in the bolt head of the bolt 28 arranged in an adjoining fastening part to fasten the bolt 28, thereby enabling prevention of rotation of the bolt 28.

Accordingly, when changing the rotation direction of one torque receiving part 16, or when removing one torque receiving part 16, whether either structure is employed, in the replacing and confirming operations of the brake pads 46, the caliper body 30 need not be removed, thereby enabling realization of safe and quick operations.

Figure 8:
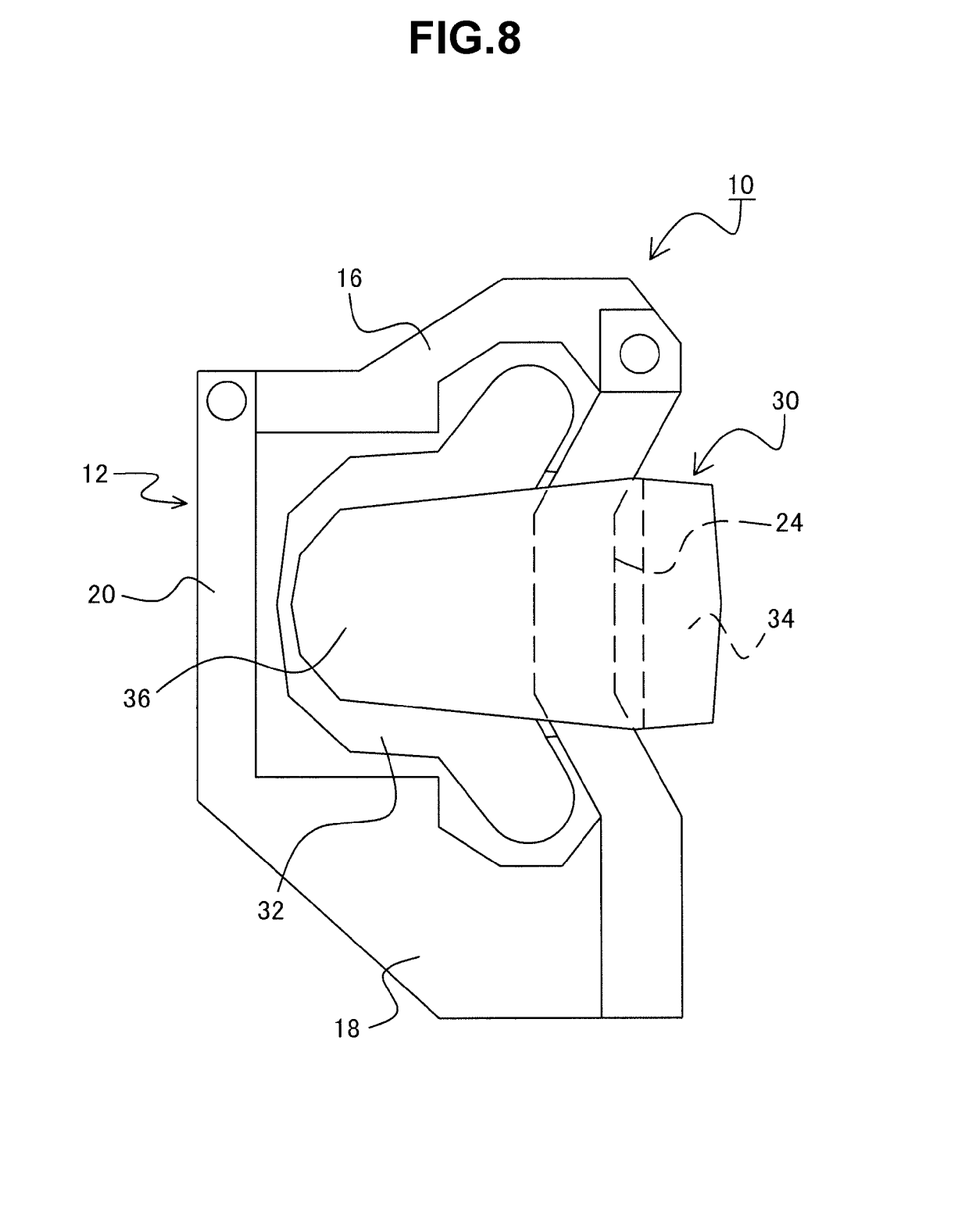
FIG. 8 is a block diagram of an example of the structure of the support when a bridge part of a caliper body is arranged on the outer peripheral side of a body hold frame in the support.

Also, in the above embodiment, for downsizing and weight reduction of the disc brake apparatus 10, the bridge part 34 constituting the caliper body 30 is interposed between the rotor 100 and body hold frame 24. However, the bridge part 34, as shown in FIG. 8, may also be arranged on the outer peripheral side of the body hold frame 24.

Also, as an example of the disc brake apparatus 10 of the above embodiment, there is illustrated a negative type disc brake apparatus which removes braking while the actuator 40 is in operation. However, the invention can also be applied to a positive type disc brake apparatus which executes braking while the actuator 40 in operation. Also, although the disc brake apparatus of this embodiment uses the cam mechanism and air chamber as the mechanism for removing braking, instead of them, there may be employed a structure to be driven by hydraulic pressure.

Here, in the above embodiment, the pad hold frame 14 and body hold frame 24 are made of separate members. However, they may also be made of a single member. The reason for this is that integral formation or separate formation of the two frames has no particular influence on the effect of the invention.

Now, the characteristics of the embodiment of the disc brake apparatus according to the invention are briefly described in the following articles.

[1] The disc brake apparatus is provided with a support in which pairs of torque receiving parts provided in both sides in a braking force tangential direction and connecting parts respectively connecting together the torque receiving parts are provided in both sides in an axial-direction of a rotor, wherein the support holds brake pads and is capable of holding a caliper body in a part of the support. In the support, at least one of the torque receiving parts is capable of being divided. The support includes an open part capable of inserting and removing the brake pads in the braking force tangential direction by dividing the torque receiving parts.

[2] In the disc brake apparatus according to the above [1] article, the support is structured by arranging a pad hold frame and a body hold frame in a frame-like shape. The pad hold frame includes the torque receiving parts and the connecting parts to hold the brake pads. The body hold frame is arranged on an outer peripheral side of the rotor, is connected to the torque receiving parts, and holds the caliper body.

[3] In the disc brake apparatus according to the above [2] article, the dividable torque receiving part includes a rotatable pivotal support part in one of a fastening end part with respect to the connecting part and a fastening end part with respect to the body hold frame. The dividable torque receiving part includes a fastening part in the other of the fastening end part with respect to the connecting part and the fastening end part with respect to the body hold frame.

[4] In the disc brake apparatus according to the above [2] or [3] article, the caliper body is structured such that a cylinder part and a claw part arranged across the rotor are connected to each other by a bridge part. The bridge part is arranged in an inner peripheral side with respect to the body hold frame.

[5] In the disc brake apparatus according to the above [2] or [3] article, the caliper body is structured such that a cylinder part and a claw part arranged across the rotor are connected to each other by a bridge part. The bridge part is arranged in an outer peripheral side with respect to the body hold frame.

INDUSTRIAL APPLICABILITY

The disc brake apparatus of the invention is useful when the brake pads of a floating type disc brake apparatus are replaced while maintaining the assembled state of a caliper body.

DESCRIPTION OF REFERENCE NUMERALS AND SIGNS

10: Disc brake apparatus
12: Support
14: Pad hold frame
16: One torque receiving part
18: Other torque receiving part
20: Connecting part
20a: Fastening part
22: Base
24: Body hold frame
26: Hold part
28: Bolt
30: Caliper body
32: Cylinder part
32a: Hold part
34: Bridge part
36: Claw part
36a: Adjuster mechanism
38: Rotation shaft
40: Actuator
42: Rod
44: Cam lever
46: Brake pad
100: Rotor

The invention claimed is:

1. A disc brake apparatus comprising:
a first torque receiving part provided at a first side of a brake pad in a braking force tangential direction;
a second torque receiving part provided at a second side of the brake pad in the braking force tangential direction of the brake pad;
a connecting part that connects the first torque receiving part and the second torque receiving part to each other; and
a body hold frame including a hold part that holds a caliper body,
wherein the first torque receiving part includes a first portion connected to the connecting part and a second portion connected to the body hold frame, and
wherein at least one of the first portion and the second portion of the first torque receiving part is structured so that the first portion is separable from the connecting part or the second portion is separable from the body hold frame.

2. The disc brake apparatus according to claim 1, wherein the first torque receiving part, the second torque receiving part, the connecting part and the body hold frame are arranged in a frame-like shape.

3. The disc brake apparatus according to claim 1, wherein the caliper body is structured such that a cylinder part and a claw part arranged across a rotor are connected to each other by a bridge part, and
  wherein the bridge part is arranged at an inner peripheral side with respect to the body hold frame.

4. The disc brake apparatus according to claim 1, wherein the caliper body is structured such that a cylinder part and a claw part arranged across a rotor are connected to each other by a bridge part, and
  wherein the bridge part is arranged at an outer peripheral side with respect to the body hold frame.

5. The disc brake apparatus according to claim 1, wherein the first portion of the first torque receiving part is pivotably connected to the connecting part, and
  wherein the second portion of the first torque receiving part is separatably fastened to the body hold frame.

6. The disc brake apparatus according to claim 1, wherein the first portion of the first torque receiving part is separatably fastened to the connecting part, and
  wherein the second portion of the first torque receiving part is pivotably connected to the body hold frame.

* * * * *